United States Patent [19]
Spector

[11] Patent Number: 4,574,181
[45] Date of Patent: Mar. 4, 1986

[54] AROMA-GENERATING AUTOMOBILE CIGARETTE LIGHTER

[76] Inventor: Donald Spector, 380 Mountain Rd., Union City, N.J. 07087

[21] Appl. No.: 658,778

[22] Filed: Oct. 9, 1984

[51] Int. Cl.⁴ ........................... F22B 1/28; F23Q 7/00

[52] U.S. Cl. .................................... 219/274; 219/276; 219/260

[58] Field of Search ............... 219/271, 272, 273, 274, 219/275, 276, 260, 262, 265, 267, 270, 263, 264

[56] References Cited

U.S. PATENT DOCUMENTS

| | | | |
|---|---|---|---|
| 2,010,675 | 8/1935 | Lewis | 219/267 |
| 2,701,836 | 2/1955 | Pavenick | 219/262 |
| 3,006,042 | 10/1961 | Calandra | 219/276 |
| 3,551,092 | 12/1970 | Masson | 219/276 |

FOREIGN PATENT DOCUMENTS

| | | | |
|---|---|---|---|
| 1322977 | 2/1963 | France | 219/260 |

*Primary Examiner*—C. L. Albritton
*Assistant Examiner*—Teresa J. Walberg
*Attorney, Agent, or Firm*—Michael Ebert

[57] ABSTRACT

An automobile cigarette lighter adapted to generate an aromatic vapor, the lighter being releasably retained within a dashboard socket having terminals therein connected to the battery of the vehicle. The lighter is constituted by a cylindrical shell having telescoped therein a spring-biased plunger. A disc-shaped heater element attached to the front end of the plunger is normally disposed at a position spaced from the socket terminals. A knob attached to the rear of the plunger projects beyond the rear end of the shell. When the knob is pressed in by a user, the plunger is advanced relative to the shell to cause the heater contact to engage the socket terminals and to be latched thereto by a bimetallic element, thereby activating the heater. When the heat generated thereby reaches a level causing the bimetallic element to bend, it releases the plunger which then returns to its normal inactive position. Formed in the plunger and the knob is a central duct extending from the heater element to an end opening in the knob. Receivable in the duct is a replaceable tubular cartridge having a heat-responsive, aroma-producing member therein which is activated by the heat to exude an aromatic vapor into the interior of the vehicle.

7 Claims, 5 Drawing Figures

13
12
T2
T1
10
11
26

16
17
18
19
24
25

13
22
24

21
15
14
10
20
22
17
18
19
16
23
22
24

AROMA-GENERATING AUTOMOBILE CIGARETTE LIGHTER

BACKGROUND OF INVENTION

1. Field of Invention

This invention relates generally to an aroma-generating automobile cigarette lighter, and more particularly to a lighter provided with a replaceable heat-responsive fragrance cartridge which gives off an aromatic vapor that is discharged into the interior of the vehicle when the lighter is activated by the user.

2. Status of Art

As used herein, the term "aroma" is not limited to pleasant or savory smells but encompasses scents that function as air fresheners, deodorants or any other odor that acts to condition, modify or otherwise change the atmosphere.

The aroma of perfumes and perfume-based products such as colognes and toilet waters was originally derived from the essential oils of plants. However, since the early 19th century, chemists have succeeded in analyzing many essential oils and in creating thousands of synthetics, some simulating natural products and others yielding altogether new scents. Perfumes today are largely blends of natural and synthetic scents and of fixatives which equalize vaporization and enhance pungency. In most liquid scents, the ingredients are combined with alcohol.

Various types of spray devices or dispensers are known for emitting aromas. Thus the patent to Dearling, U.S. Pat. No. 3,330,481, discloses a dispenser for wafting into the atmosphere an insecticide, a pleasant smelling scent or any other aroma, this being accomplished by means of a pressurized container. When the actuating button of this container is pressed, a dispersant is released onto an absorbent material, the absorbent dispersant permeating the atmosphere.

While the prior art discloses various embodiments of aroma dispensers, none of these devices is particularly adapted for use in an automotive interior, an environment having special requirements. The atmosphere in most automobiles is somewhat unpleasant, for it is often permeated by exhaust and engine fumes, by odors emanating from the road, and in many cases by tobacco smoke. Hence it becomes desirable to mask or supplant these odors by more agreeable scents.

While a perfume odor may be desirable in a vehicle, inasmuch as personal tastes differ and the choice of fragrance may also depend on other variables, the availability of an aroma dispenser providing a single scent falls short of what is required. Moreover, in some instances the aroma called for is not a perfume but a scent acting as a stimulant to keep the driver awake under driving conditions that may be soporific. Thus the type of pleasing scent that may be appropriate for a morning drive is usually not the same as that suitable for dusk; whereas when driving late at night, what may then be desirable is an odor which, though perhaps unpleasant, functions to stimulate and awaken rather than relax the driver.

My prior U.S. Pat. No. 4,200,229 discloses an aroma-dispenser which is mountable under the dashboard of an automobile and takes the form of a replaceable cartridge receivable in a stationary holder so that the user can insert therein whichever cartridge gives off an aroma suitable for a given occasion or satisfying a personal preference. The cartridge, in this instance, includes a bottle containing a liquid scent and a hand-operated suction pump which when actuated serves to spray a liquid scent into the car interior.

The Mangels Pat. No. 2,721,098 is also concerned with the disagreeable nature of tobacco smoke and other fumes permeating automobile interiors, and provides a deodorizer structure that is mountable in the vehicle.

In an automobile, the act of smoking is related to the standard cigarette lighter releasably held in a dashboard socket. In order for the driver or passenger in a front seat of the vehicle to light up, he must press the knob of the lighter. This action causes a spring-biased plunger having a disc-shaped heater element at its front end to advance and to bring the heater contacts into engagement with terminals connected to the car battery, thereby energizing the heater and causing it to glow. The plunger is retained in its advanced position by a bimetallic latching element; but when the heat produced by the heater reaches a predetermined temperature level, the latching element disengages the plunger which returns to its normal position.

Though the heater is then deactivated, it has a relatively high heat capacity and continues to glow so that when the user withdraws the lighter from the dashboard socket, he can then light his cigarette from the still glowing heater.

Thus, in an automobile, the act of smoking is associated with the manipulation of a standard dashboard lighter. The deleterious effects of cigarette smoking are now widely recognized, and literally millions of smokers have tried to break this harmful habit, but have usually failed to do so.

An addiction to cigarette smoking is extremely difficult to overcome, for this addiction is tied in not only to the physiological effects of nicotine, but also to the psychological gratification gained from the familiar steps of lighting up and manipulating a cigarette. Thus one device in common use to break the smoking habit is a dummy cigarette which contains no tobacco but can be held in the mouth like a real cigarette and manipulated by the user.

SUMMARY OF INVENTION

In view of the foregoing, the main object of this invention is to provide an automobile cigarette lighter which when operated by the user, generates an aromatic vapor which is exuded into the interior of the vehicle.

More particularly, an object of the invention is to provide a cigarette lighter adapted to receive a replaceable heat-responsive fragrance cartridge, which, when the lighter is activated, discharges an aromatic vapor.

A significant feature of the invention lies in the fact that the cartridge is rendered effective only in the interval during which the heater is hot, this relatively short interval being predetermined by the characteristics of the heater structure. Hence each time the lighter is pressed in, a limited dosage of aromatic vapor is generated. In this way, the user can avoid an excessive concentration of fragrance within the confines of the vehicle; and by intermittently pressing in the lighter to activate the heater, the user can maintain whatever concentration is desired.

Another object of the invention is to provide, in conjunction with an automobile cigarette lighter, a fragrance cartridge which resembles a cigarette, such that when an occupant of the vehicle who is addicted to cigarettes feels an urge to smoke, he can suppress this impulse, yet obtain gratification, by substituting for a cigarette the fragrance cartridge which he inserts in the lighter to generate a pleasing fragrance. The fragrance supplied by the cartridge may be one simulating the odor of tobacco without, however, its accompanying noxious effects.

Also an object of this invention is to provide an aroma-generating cigarette lighter which is also fully capable of functioning as an ignition source for cigarettes, so that the lighter may be used either to light a cigarette or to generate a pleasing aroma.

Briefly stated, these objects are attained in an automobile cigarette lighter adapted to generate an aromatic vapor, the lighter being releasably retained within a dashboard socket having terminals therein connected to the battery of the vehicle. The lighter is constituted by a cylindrical shell having telescoped therein a spring-biased plunger. A disc-shaped heater element attached to the front end of the plunger is normally disposed at a position spaced from the socket terminals. A knob attached to the rear of the plunger projects beyond the rear end of the shell. When the knob is pressed in by a user, the plunger is advanced relative to the shell to cause the heater contact to engage the socket terminals and to be latched thereto by a bimetallic element, thereby activating the heater. When the heat generated thereby reaches a level causing the bimetallic element to bend, it releases the plunger which then returns to its normal inactive position. Formed in the plunger and the knob is a central duct extending from the heater element to an end opening in the knob. Receivable in the duct is a replaceable tubular cartridge having a heat-responsive, aroma-producing member therein which is activated by the heat to exude an aromatic vapor into the interior of the vehicle.

OUTLINE OF DRAWINGS

For a better understanding of the invention as well as other objects and further features thereof, reference is made to the following detailed description to be read in conjunction with the accompanying drawings, wherein.

DESCRIPTION OF INVENTION

Figures 1, 2, 3, 4, 5:
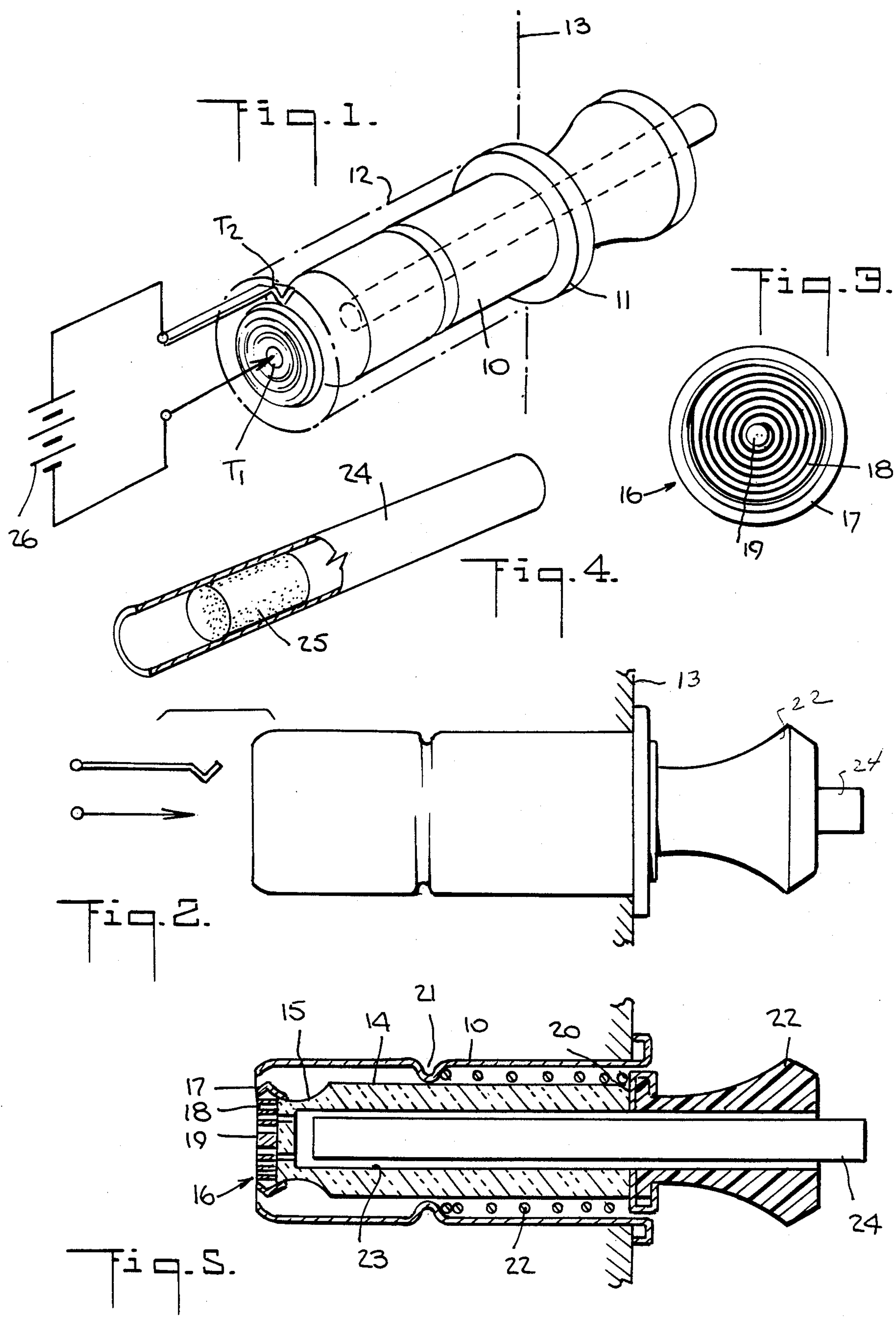
FIG. 1 is a perspective view of an aroma-generating cigarette lighter received in an automobile dashboard socket, the lighter being shown in its activated state.
FIG. 2 illustrates the same lighter in its normal inactive state.
FIG. 3 is a front view of the electrical heater included in the lighter.
FIG. 4 is a perspective view of the replaceable fragrance cartridge, partly cut away to expose the heat-responsive aroma-producing member therein.
FIG. 5 is a longitudinal section taken through the lighter.

Referring now to the drawing, a lighter in accordance with the invention includes a cylindrical metal shell 10 having an annular flange 11 at its rear end, the flange lying against the ringed end of a tubular socket 12 mounted on the dashboard 13 of an automobile. The socket and the dashboard are conventional and are indicated by dashed lines.

Telescopically received within shell 10 and coaxially disposed therein is a plunger 14 formed of porcelain or other heat-resistant insulating material having a conical front end 15 to which is attached a disc-shaped electrical heater, generally designated by numeral 16.

Heater 16 is formed by a metal bezel 17 within which is a spiral strip 18 of electrical resistance material. The inner end of the spiral is connected to a central electrode 19, and the outer end to bezel 17. Hence to energize the heater, a voltage must be applied between electrode 19 and bezel 17, the resultant current flow acting to heat the spiral.

Terminating the rear end of plunger 14 is a metal collar 20. Shell 10 is provided at an intermediate position therein with a circumferential dimple 21. A helical spring 22 surrounding the plunger occupies the annular space between plunger 14 and shell 10, the spring being confined and compressed between collar 20 and dimple 20.

Attached to the rear end of plunger 14 and projecting rearwardly therefrom beyond the rear of shell 10 is a knob 22 whose front section has a diameter smaller than the inner diameter of the shell. Formed centrally in plunger 14 and in knob 22 is a cylindrical duct 23. This duct extends along the longitudinal axis of the plunger and knob from a point directly adjacent heater 16 at the front end of the plunger to an opening at the end of the knob.

Small openings may be formed in the insulating barrier between the heater spiral and the duct to permit hot air flow therethrough.

Receivable within duct 23 is a tubular fragrance cartridge 24 housing at its front end at a position close to heater 16 when the cartridge is fully inserted, a plug 25 of porous material, such as cotton fibers or open cell foam plastic. The plug is impregnated with a volatile liquid fragrance whose aroma is pleasing or stimulating, depending on the intended purpose of the cartridge. Alternatively, the plug or aroma-producing member may be in the form of a gel or soft plastisol having the liquid fragrance disposed therein.

When, as shown in FIG. 1, the plunger knob is pressed in by the user, the plunger is projected from the front end of shell 10 and advanced to cause a socket terminal $T_1$ to engage the central electrode 19 of the heater and a latching terminal $T_2$ to engage the bezel 17 and to retain the plunger in its activated position in the socket.

Terminals $T_1$ and $T_2$ are connected to the opposite ends of the car battery 26, as a consequence of which the engaged heater 16 is energized and the spiral heater element 18 is caused to heat up and glow, this action taking a few seconds. When the temperature of the heater rises to a predeterm level, latching, terminal $T_2$, which is formed of bimetallic, thermastatic material, bends to an extent releasing bezel 17. As a result, helical spring 22, which is compressed when the lighter is pressed in, expands to return the plunger to its inactive normal position, as shown in FIG. 2, the terminals $T_1$ and $T_2$ then being disengaged.

Thus the cartridge, instead of being in the form of a straight tube, may be provided at its exposed end with a flared section forming an annular flange which fits against the outer face of knob 22 when the cartridge is inserted in the lighter. Hence to activate the lighter, one presses the flange of the cartridge, thereby pushing in the knob.

Also, rather than a plug 25 of impregnated porous material in the cartridge, this material may take the form of an inner liner in the cartridge to form an open core therein to permit air flow to promote volatilization of the impregnant.

The heater has a substantial heat capacity and remains glowing for a few seconds after it is disconnected from the battery for a period sufficient to permit the user, if he wishes, to remove the lighter from socket 12 and light up a cigarette. However, if the lighter is not removed from the socket and has a fragrance cartridge inserted therein, then heat from the heater 16 in the period during which it is energized and in the post-energization interval in which it remains hot, acts to volatilize the liquid in the plug to produce an aromatic vapor which is discharged from the open end of the tubular cartridge into the automobile interior.

The cartridge has an effective life that depends on how much liquid fragrance is contained therein. One can, when the cartridge is exhausted, replace it with a fresh cartridge having the same or a different fragrance. And, in practice, one may supply the user with a carton of cigarette-like cartridges having different aromas, as indicated, for example, by a color-coded tip on the front end of the cartridge. One of the fragrances available may simulate cigarette smoke, so that if the user has a craving for such smoke and yet doesn't wish to indulge, he may insert the tobacco fragrance cartridge into the lighter.

While there has been shown and described a preferred embodiment of AROMA-GENERATING AUTOMOBILE CIGARETTE LIGHTER in accordance with the invention, it will be appreciated that many changes and modifications may be made therein without, however, departing from the essential spirit thereof.

I claim:

1. An automobile cigarette lighter adapted to generate an aromatic vapor, the lighter being releasably retained within a dashboard socket provided with terminals connected to a battery of the vehicle, said lighter comprising:

A. a cylindrical shell;

B. a spring-biased plunger telescopically received in the shell;

C. a disc-shaped heater attached to a front end of the plunger and having contacts which in an inactive position of the lighter are spaced from the terminals;

D. a knob attached to a rear end of the plunger and projecting beyond the shell, whereby when the knob is pressed in, the plunger is advanced to an activated position in which the contacts of the heater engage the terminals in the socket to effect energization of the heater;

E. a latching element to retain the plunger in its activated state and to release the plunger when the heater temperature reaches a predetermined level, said plunger and said knob having a central duct therein extending longitudinally from a point adjacent the heater to an opening in the knob; and F. a replaceable tubular fragrance cartridge inserted in the duct and having an open-ended heat-responsive aroma-producing element therein which is activated by the heat to exude an aromatic vapor into the vehicle interior, said cartridge having a length relative to that of said duct whereby a front end of the inserted cartridge lies adjacent said heater in heat exchange relationship therewith, and a rear end thereof extends beyond the opening in the knob whereby the cartridge may readily be removed from the duct, the aroma being discharged from the open rear end of the cartridge.

2. A lighter as set forth in claim 1 wherein said latching element is formed by one of said terminals which is of bimetallic construction.

3. A light as set forth in claim 1, wherein said aroma-producing element is constituted by a plug housed in said cartridge.

4. A lighter as set forth in claim 3 wherein said plug is of porous fibers impregnated with a volatile liquid fragrance.

5. A lighter as set forth in claim 3 wherein said plug is formed of a plastisol having a liquid fragrance dispersed therein.

6. A lighter as set forth in claim 1, wherein said plunger at its front end has openings therein which communicate with said duct to permit hot air flow from the heater to the duct.

7. A lighter as set forth in claim 1, wherein said replaceable tubular cartridge which is inserted in said duct is selected from a plurality of such cartridges which have a cigarette-like form and have elements therein producing different aromas whereby the user may readily change the aroma generated by the lighter.

* * * * *